Dec. 19, 1933.  W. P. DE SAUSSURE, JR  1,940,584
HAT AND COAT RACK
Filed March 2, 1931  3 Sheets-Sheet 1
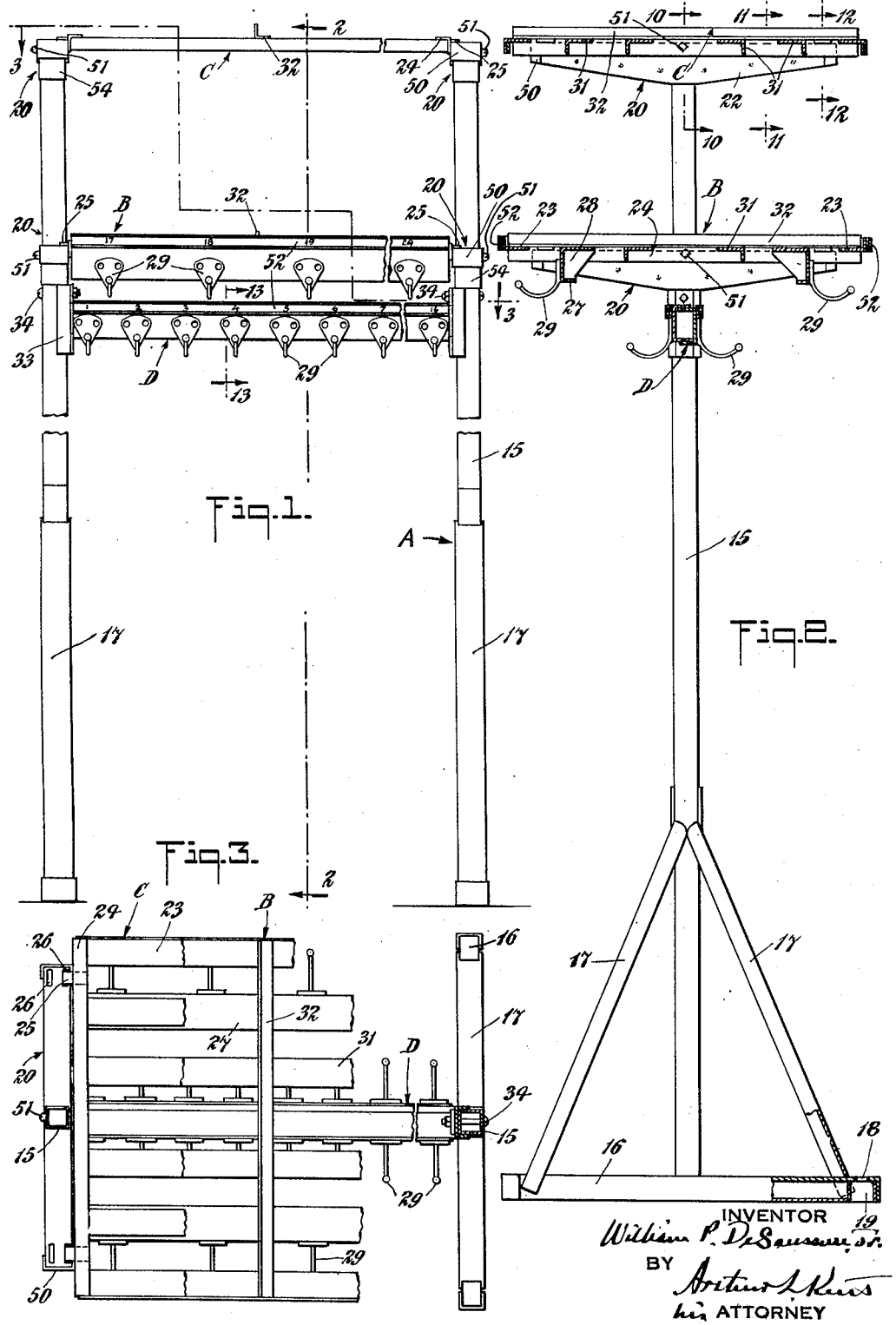

Dec. 19, 1933.    W. P. DE SAUSSURE, JR    1,940,584
HAT AND COAT RACK
Filed March 2, 1931    3 Sheets-Sheet 2
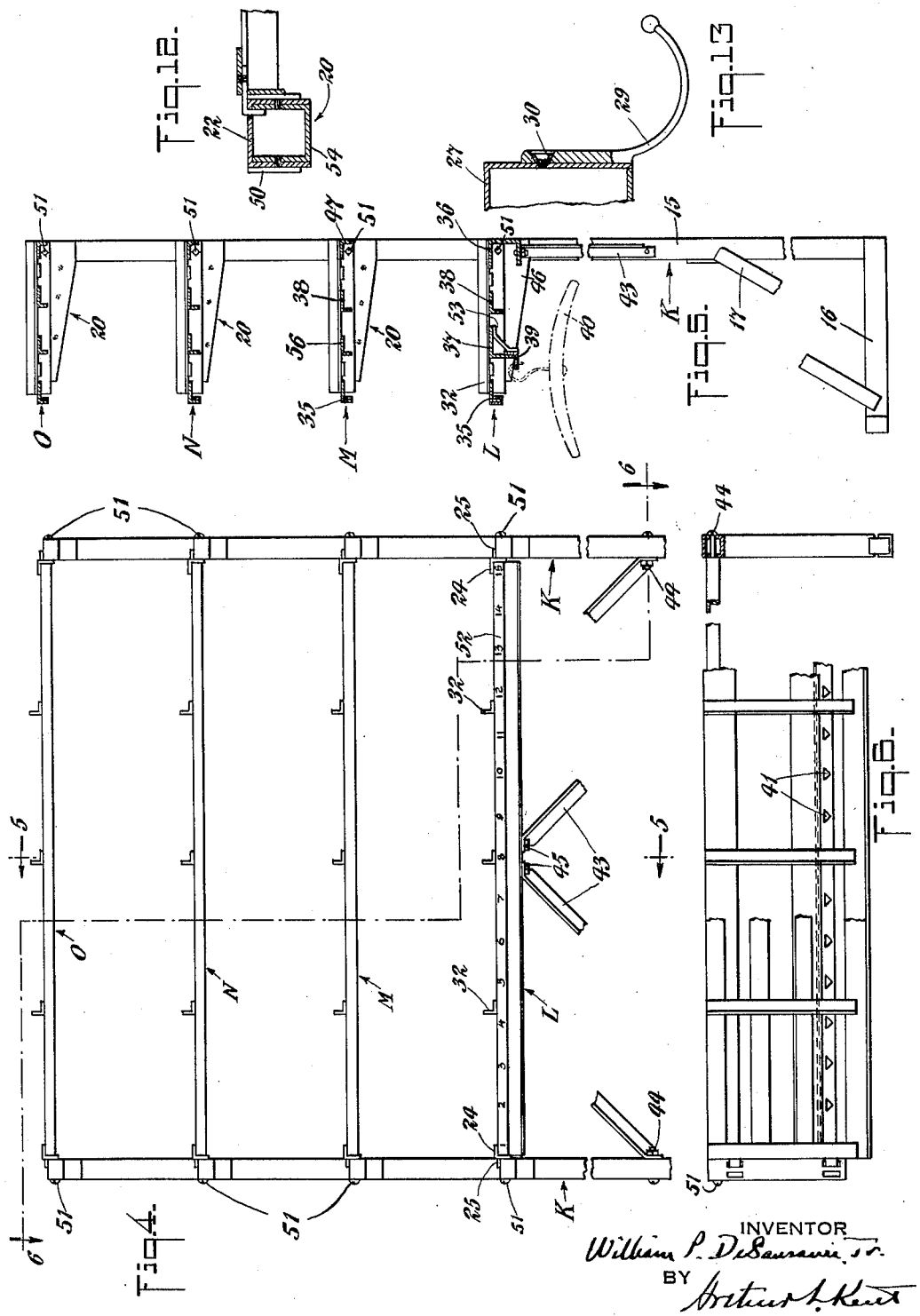

Dec. 19, 1933.  W. P. DE SAUSSURE, JR  1,940,584
HAT AND COAT RACK
Filed March 2, 1931  3 Sheets-Sheet 3
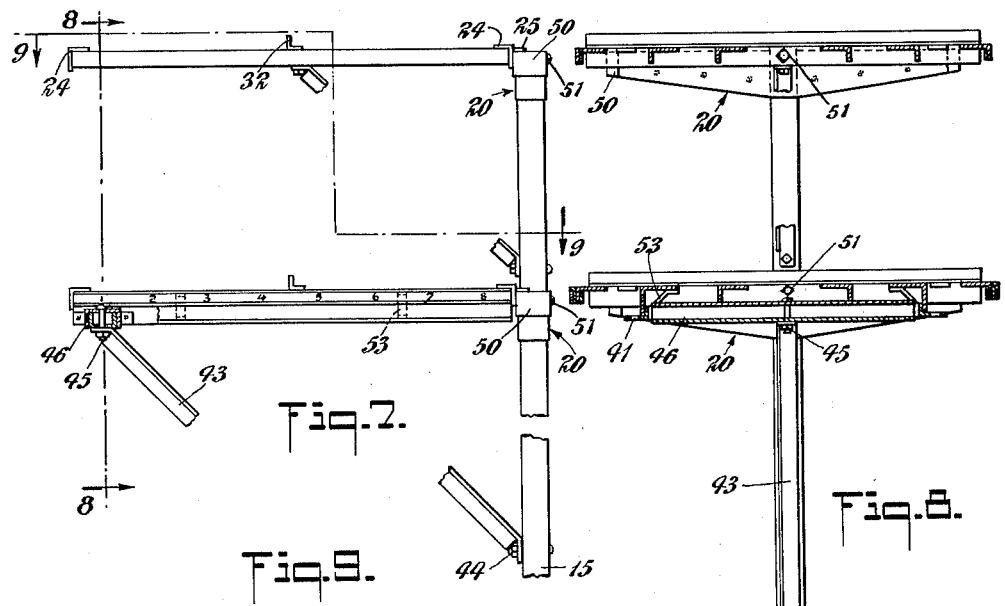
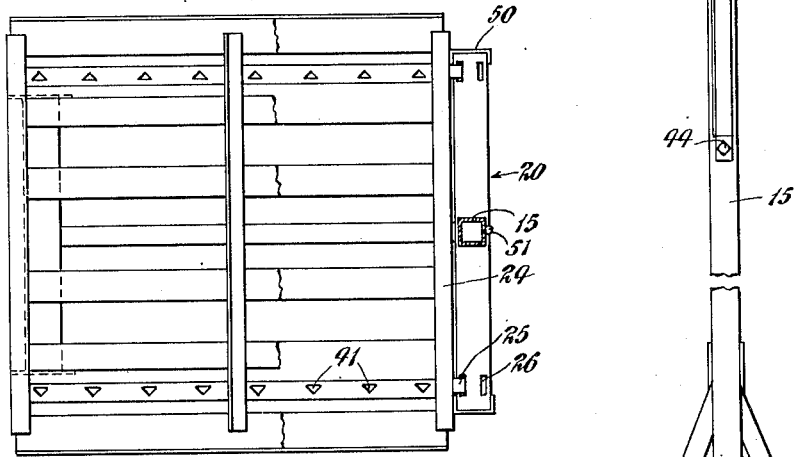
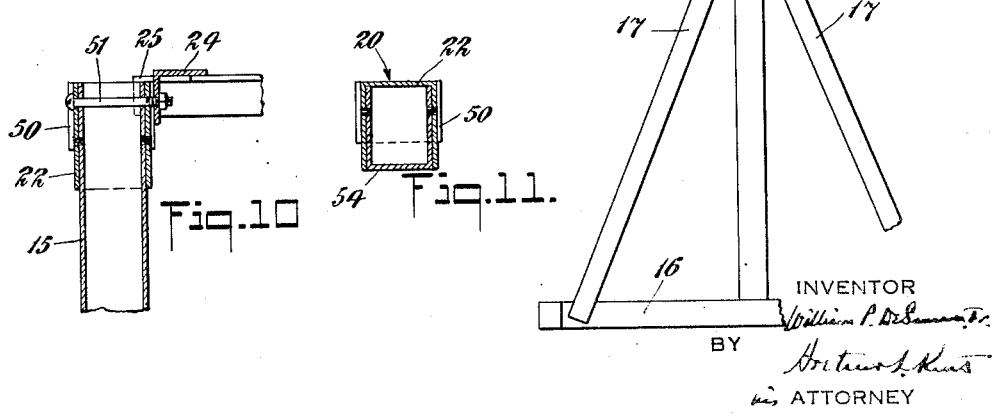
INVENTOR
BY
ATTORNEY Patented Dec. 19, 1933

1,940,584

UNITED STATES PATENT OFFICE 1,940,584

HAT AND COAT RACK

William P. De Saussure, Jr., Englewood, N. J., assignor to De Saussure Equipment Company, West New York, N. J., a corporation of Delaware Application March 2, 1931. Serial No. 519,524

6 Claims. (Cl. 211—1)

The present invention relates to combined hat and coat racks, and has for its general object the provision of an improved rack or support for coats and other garments, hats, parcels and the like for use in restaurants and other places, which possesses the merits of simple, compact and relatively inexpensive construction, and which, while made up of parts or units which may readily be assembled and set up or disassembled, is, when assembled, particularly rigid and substantial. My improved rack has the further advantages of being, if desired, readily portable when assembled, and of occupying a comparatively small space in relation to its capacity as a holder or container for hats, garments and the like. Other advantages will appear hereinafter.

To the above and other ends my invention consists in the features of construction, combinations of devices and arrangements of parts hereinafter described and particularly pointed out in the claims.

The invention will be described in detail in connection with the drawings which illustrate the preferred form and modifications thereof.

In the drawings:—

Fig. 1 is a side elevation of a coat and hat rack of the coat hook type constructed in accordance with the present invention;

Fig. 2 is a vertical section on the line 2—2 of Fig. 1;

Fig. 3 is a plan view, partly sectional, taken on the line 3—3 of Fig. 1;

Fig. 4 is a side elevation of the upper parts of a coat and hat rack of the coat hanger type;

Fig. 5 is a vertical section on the line 5—5 of Fig. 4;

Fig. 6 is a plan view, partly sectional, taken on the line 6—6 of Fig. 4;

Fig. 7 is a side elevation of the upper parts of a modified form of coat and hat rack of the coat hanger type;

Fig. 8 is a section on the line 8—8 of Fig. 7;

Fig. 9 is a plan view, partly sectional, taken on the line 9—9 of Fig. 7;

Fig. 10 is an enlarged section on the line 10—10 of Fig. 2;

Fig. 11 is an enlarged section on the line 11—11 of Fig. 2;

Fig. 12 is an enlarged section on the line 12—12 of Fig. 2; and

Fig. 13 is an enlarged section on the line 13—13 of Fig. 1.

Three general types of construction are illustrated. The first form, that shown more particularly in Figures 1, 2 and 3, is of the coat hook type, where the coats are hung directly on the rack by means of hooks permanently attached to the latter. In the second and third forms, the coats are first placed on the usual curved hangers, and the latter with the coats thereon are then brought into engagement with the rack. Another line of distinction between the three forms shown is the space provided for the hats corresponding to the space provided for the coats. In the first form, there are two hat shelves and each of these shelves is divided into sections, each section having 6 hooks arranged therebeneath. It is necessary, therefore, when the rack is filled, to stack 3 hats one on top of another on each section of each hat shelf. In the second form, Figures 4, 5 and 6, there are four hat shelves and provision is made for 4 coat hangers for each section of the hat shelves thereabove. With this construction there is a separate section of hat shelf for each hat. In the third form, Figures 7, 8 and 9, there are two hat shelves, and space is provided for 4 coat hangers for each section of the hat shelves thereabove. It is necessary, therefore, when the rack is filled, to put two hats, one on top of the other, in each section of the hat shelves.

The first and third forms of construction are double-sided, while the second form is single-sided so that it may be placed against a wall. In the first and second forms, the coat and hat shelves are supported at both ends. In the third form, the coat rack and hat shelves are supported at one end only. This last form of construction is particularly adapted for use in a closet, the supporting post being secured to the rear wall of the closet.

The forms shown have been selected as representative of the various ways in which the novel features of the present invention may be applied, and not as constituting the only forms which may be employed.

Referring first to the construction shown in Figures 1, 2, 3, 10, 11, 12 and 13, the rack comprises a knock-down framework or skeleton structure made up of a number of detachable elements or units. These elements or units include two end frames, each designated generally by the reference character A, a lower combined coat hook carrying frame and hat shelf B, and an overlying shelf C adapted to support hats, parcels and the like. Below the lower shelf is a hook supporting bar D. The end frames are set vertically and are detachably connected by the horizontal shelf elements B and C and bar D in such a way as to provide a rigid structure, as will subsequently be set forth in detail.

Each end frame A comprises a vertical post 15 of metal, square in cross section and hollow. The lower end of each post rests upon and is welded to a foot-piece 16 of similar construction and is braced thereto by two channel members 17, 17, welded to both the post 15 and foot-piece 16. At each end of the foot-piece 16 is an aperture 18 for a screw, bolt or other fastening means, and a rectangular chamber or socket 19 adapted to receive a castor, if it is desired to make the rack readily movable.

The shelves B and C extend between the end frames and are supported by cross bars 20. Each cross bar 20 is formed (see Figures 10, 11 and 12) of an inverted metallic channel 22, the distance between the inner faces, flanges or side webs of which is substantially the outside width of the post 15. At the center of the channel, the central web of the channel is cut away to allow the post 15 to be passed therethrough and then secured to the side webs or flanges of the channel by spot-welding. The cross bar so formed is desirably strengthened by channels 54 having an outside width substantially the same as the inside width of the inverted channel so that their flanges may be placed inside the flanges of the channel 22. The overlapping webs or flanges are then united by spot-welding so as to form a hollow member of the cross-section shown in Figures 11 and 12. The ends of the cross bars may be closed, as shown, by lapping a piece of steel 50 around each end.

The shelf B comprises angle bars 23 on either side arranged with one flange extending upwardly and the other inwardly. The ends of the bars 23 are connected by end-pieces 24, also of angle bar, with one flange extending downwardly and the other inwardly. The overlapping ends of the inwardly extending flanges of the bars 23 and end-pieces 24 are united by spot-welding to form a rectangular frame.

The frame so formed is releasably secured to the cross bars 20 by spaced angles 25, the horizontal arm of each of which extends through a slot in the vertical flange of one of the angle bars 24 just below the horizontal flange of the latter, to which latter flange such arm is secured by spot-welding. The other arm of each angle 25 extends downwardly parallel to but spaced outwardly from the downwardly extending vertical flange of the angle bar 24, so as to form a slot therebetween. This downwardly extending arm engages with a slot 26 in the upper surface of one of the cross bars 20 of the end frames, as shown more particularly in Figure 3.

It will be noted that the horizontal portions of the angles 25 serve to support the frames B and C and maintain them in horizontal position while the vertical portions of such angles serve to hold the ends of the frames B and C against the vertical faces of the cross bars 20, and so give horizontal rigidity to such frames. The frame B is held in place by it own weight and may be detached from the cross bars of the end frames by merely lifting it vertically. To prevent accidental displacement of the angles 25 from the slots 26, a blot 51 (Figure 10) may be passed through the vertical flange of each angle bar 24 and the post 15 adjacent thereto.

The frame B carries two hook bars 27, each of channel form having flanges of different width arranged with its central web vertical and with the wide flange uppermost. The ends of the wide flange overlap and are spot-welded to the underside of the horizontal flanges of the angle bars 24. Corner pieces or brackets 28 may be used to advantage to stiffen the channel 27 at its ends and also adjacent the shelf partitions to be described later. On the outer face of each channel 27 are attached a series of coat hooks 29. As shown, these hooks are of a usual form provided with counter-sunk screw holes adapting them to be readily attached to a wooden support by screws. These counter-sunk holes are utilized for connecting these hooks to the channels, not by screws or bolts, but by a welding method. This method involves the use of metallic cups 30 formed to fit the counter-sunk holes. These cups are placed in the holes, and then the bottoms thereof are spot-welded to the underlying surface of the channel 27.

The hook bars 27 are arranged a short distance back of the outer edge of the hat shelf thereabove, so that coats or the like hung on the hooks 29 cannot obscure the numerals on the margin of the shelf. The bars 27 are deep enough to provide ample room between the underside of the hat shelf and the top of the hooks to allow ready engagement and disengagement of coats or the like with the hooks.

Between the two hook bars 27, angle bars 31 extend lengthwise of the frame B, having their ends overlapping and spot-welded to the horizontal flanges of the angle bars 24. The angle bars 23, hook bars 27 and angle bars 31 form a grid, the bars of which are sufficiently close to support hats, parcels and the like. Longitudinally, this grid surface is divided into sections, each of sufficient size to accommodate a hat, by very low partitions formed of angle bars 32, extending across the frame and secured to each of the grid forming elements by spot-welding. These cross bars aid materially in stiffening the frame. In the construction shown in Figure 1, three partitions are used, two being in the part of the rack broken away.

The construction of the upper frame C is similar to that of frame B except that in place of the hook bars 27 an additional pair of angles 31 are employed to give the desired grid surface.

It is desirable to provide more hooks than can conveniently be placed on the channel bars 27. These additional hooks are conveniently mounted on both sides of a special hook supporting bar D extending between the end frame posts below the frame B. This bar is formed, as shown more particularly in Figure 2, of two overlapping channels welded together to form a hollow bar. Welded onto each end of the bar D are short vertical channels 33, the flanges of which embrace the posts 15 and give the necessary lateral support to the bar D. Vertical support is obtained by bolts 34, which pass through the upper ends of the channels 33 and the posts 15.

It will be noted that, regarding one section of the rack as the space betwen the center line of one of the end frames and the adjacent partition 32 or between two adjacent partitions 32, there are on each side of the rack in each section two hooks on the frame B and four on the bar D. The small number of hooks on the coat bar 27 allows the ready passage of coats to and from the coat bar D between the coats hanging from the coat bar 27. As the coats on the latter are spaced apart they can be readily separated to reach the bar D. The further the coats are from their hooks the more widely they may be pushed apart, and, hence, it is desirable to arrange the hooks on the bar D considerably lower than the hooks on the bar 27.

As there are only two hat spaces for each set of six coat hooks, when the rack is filled the hats must be stacked on each other three deep on each shelf. Check numbers are arranged over the hooks, and the hats are located first by the fact that they are placed in the sections of the shelves corresponding to the hook numbers and second by the insertion of numbered checks in the hat bands. The numbers for the hooks may be printed on celluloid strips held in place by metal strips having inturned edges. These metal strips are welded to the angle bars 23 and hook bar D.

It will be noted that slots 26 are provided along both margins of the cross bars 20 so that a further set of shelves may be connected to the cross bars and a line of coats and hat racks of any desired length may be formed. The hooks 29 are so spaced with respect to the center line of the end supports that if another section is added the adjacent end hooks of the two sections are separated by the same distance as the various hooks in each section.

The rack shown in Figures 4, 5 and 6 is of the coat hanger type, as distinguished from the coat hook type of Figures 1, 2 and 3. Another distinguishing feature is that this second form of rack is single-sided instead of double-sided. This form of rack comprises end frames K, a combined coat hanger carrying frame and hat shelf L and three superimposed hat shelves M, N and O. The construction of the end frames K is similar to that of the end frames A except that, as the rack is single-sided, the foot-piece 16 extends only one way from the post 15, and only one brace 17 is provided between the post 15 and the foot-piece 16, and the cross bars 20 extend from the post 15 on one side only, otherwise being of the same construction as the cross bars 20 in the first form, except that shelf engaging slots 25 are formed in the cross bars adjacent the posts 15 as well as at the outer ends of such cross bars.

The lower shelf L comprises an outer angle bar 35, an inner angle bar 36 and intermediate angle bars 37 and 38. To the depending flange of the bar 37 is welded the upstanding flange of an angle bar 39, the other flange of which extends outwardly so that the two angles combined form a Z bar. The outwardly extending flange of the angle bar 39 has a series of spaced apertures 41 for receiving the hooks of a series of coat hangers 40. It will be noted that the flanges of the bar 37 are exceptionally wide not only to give strength but also to bring the hanger engaging flange of the bar 39 sufficiently below the shelf as a whole to allow ready attachment and detachment of the hangers. Braces 53, between the angles 37 and 39, under the two outer partition angle bars 32, give additional stiffness to the coat hanger Z bar and the frame L as a whole. The angle bars 35, 36, 37 and 38 are connected at the ends of the frame by end-pieces 24, each formed of angle bar. These end-pieces are supported from the cross bars 20 of the end frames by projecting angle members, in the manner shown in Fig. 12. Between the end-pieces 24 are three angle bars 32 partitioning the shelf surface into four equal divisions and at the same time stiffening the shelf structure.

The frames L, M, N and O serve to keep the two end frames K spaced apart a fixed distance. They have little effect, however, in preventing the entire rack rocking to and fro in a longitudinal direction. To provide the stiffness desired in such direction, diagonal braces 43 of angle bar are provided. At their lower ends, these braces are detachably secured to the posts 15 by bolts 44, and at their upper ends they are similarly secured by bolts 45 to the lower flange of a channel bar 36. The bolts 51, by which the ends of the frame L are releasably held in fixed relation to the end frames K, complete the rigid triangular bracing frames composed of end frames K, frame L and diagonal braces 43. Similar braces 43 may be used with the rack shown in Figures 1, 2 and 3.

The superimposed hat shelves M, N and O are similar in construction to the shelf L, except that the Z bar formed of the angles 37 and 39 is replaced by a single small angle bar 56, the channel bar 36 is replaced by a small angle bar 47, and there are no stays extending from the centers of the shelves to the end frames.

Figs. 7, 8 and 9 show a single-ended, double-sided rack of the coat hanger type. As there is only one end support, the upper end of the latter should be secured to the rear wall of the closet or the like by a bolt or screw (not shown). Apart from that fact and the fact that the rack is double sided and the brace is connected to a bar 46 extending across the underside of the end of the shelf instead of to a flange on one of the grid bars, the construction is substantially identical with that of the second form, shown in Figs. 4, 5 and 6. The same reference numerals as are used in connection with the last mentioned figures are also used on Figs. 7 to 12, inclusive to indicate corresponding parts.

It will be understood that the particular constructions illustrated and described are merely illustrative of the general principles involved in this invention and that numerous changes may be made therein without departing from the spirit of the invention. Hence, where in the claims such terms as hat and coat rack, hat shelves and the like are employed, it is to be understood that these are not to be interpreted as limiting the claims to the employment of the rack in connection with coats, hats and the like, specifically.

What is claimed is:

1. A rack of the character described, comprising a vertical end frame formed of a single hollow metal upright of square cross-section, and a cross bar comprising an inverted channel through the central web of which the upright passes, the flanges of said channel being welded to the sides of the upright.

2. A rack of the character described, which comprises an end support formed with a single upright, a hat shelf carried by said end support, comprising a plurality of longitudinal bars spaced to form a grid, cross bars connecting said bars at their ends, the cross bar adjacent said end support being formed of an angle bar having one flange overlying and welded to the ends of the longitudinal bars and the other flange extending downwardly, and spaced angle members each having one arm extending through a slot in said other flange and welded to the under side of the first flange and the other arm extending downwardly parallel to but spaced apart from the second flange to form a slot to receive a portion of the adjacent end support.

3. A rack of the character described, which comprises a metal support, a series of garment supporting hooks having a base with screw holes therein, and means for attaching said hooks to a vertical face of said support comprising metal cups spot-welded at their centers to said support and engaging peripherally with the margins of the screw holes in said hooks.

4. A rack of the character described, comprising a vertical end frame formed of a single hollow metal upright of square cross-section, a cross bar comprising an inverted channel through the central web of which the upright passes and the flanges of which are welded to the sides of the upright, and a second channel the flanges of which overlap and are secured by welding to the flanges of the first channel, and a horizontal frame supported by said end frame.

5. A rack of the character described, which comprises an end support formed of a single upright and a cross bar extending laterally therefrom, and a combined hat shelf and coat support carried by said end support, comprising a series of at least three longitudinal bars on one side of the central longitudinal vertical plane of said upright spaced to form a grid and connected at their ends by cross bars, the bar next the outermost bar being of Z form, the upper flange of which extends horizontally inwards and forms a part of the hat supporting surface while the lower flange projects horizontally outwards and is provided with openings to receive the hooks of coat hangers.

6. A rack of the character described, which comprises an end support formed of a single upright and a cross bar extending laterally therefrom, and a combined hat shelf and coat support carried by said end support, comprising a series of at least three longitudinal bars on one side of the central longitudinal vertical plane of said upright spaced to form a grid and connected at their ends by cross bars, the bar next the outermost bar being formed with two horizontal flanges connected by a substantially vertical web, the lower flange extending outwardly and being provided with openings to receive the hooks of coat hangers.

WILLIAM P. DE SAUSSURE, Jr.